INVENTOR
GEORGES. A. DE GUIRE

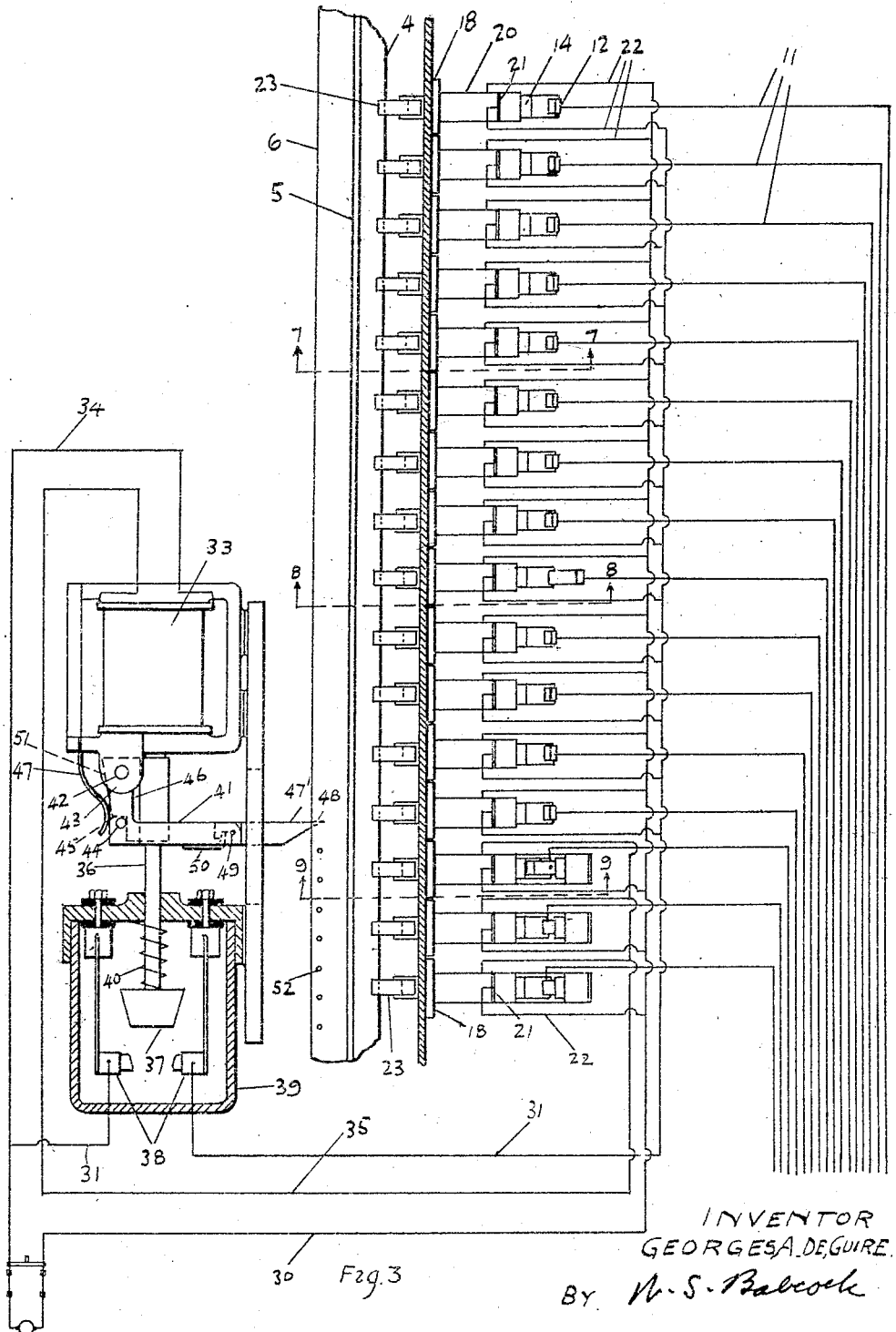

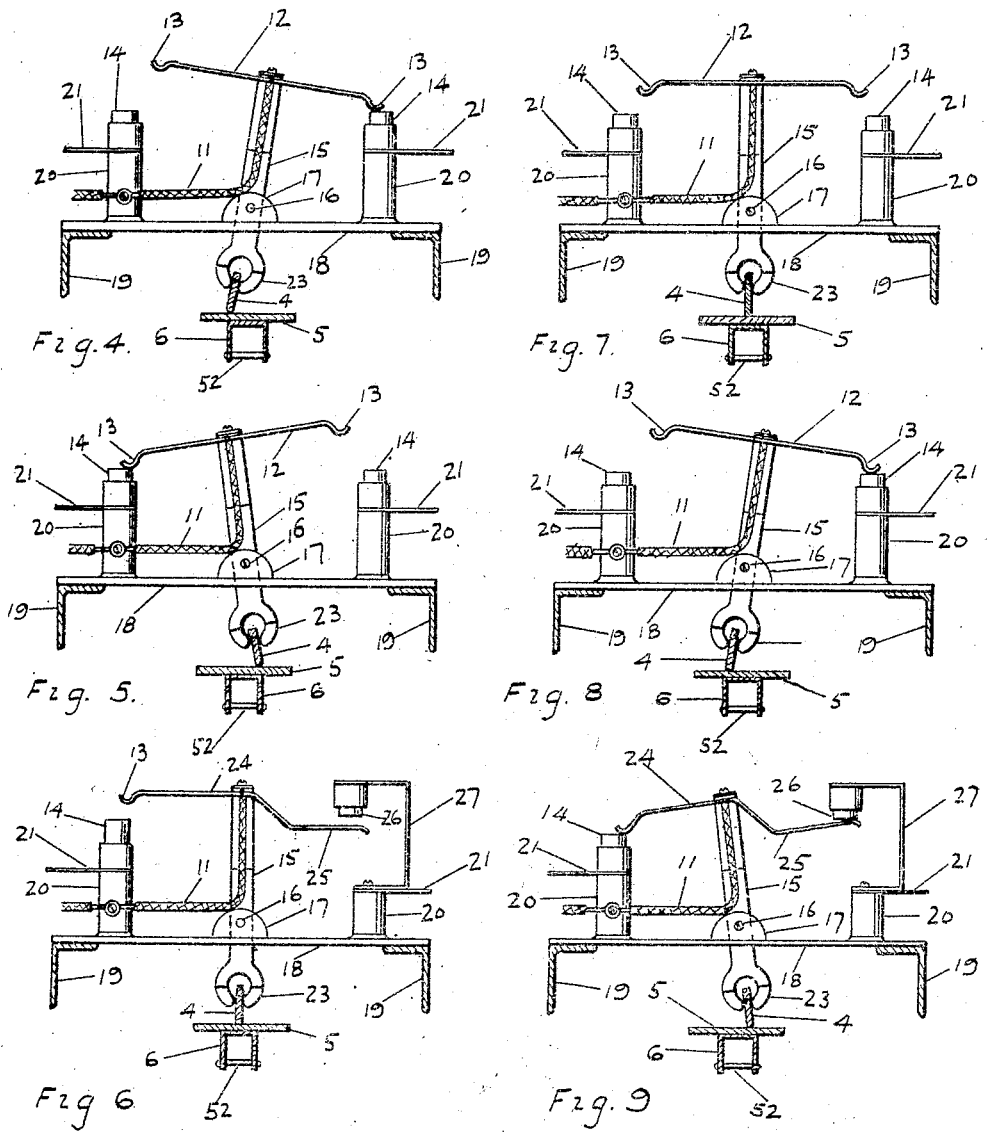

BY M. S. Babcock

ATTY

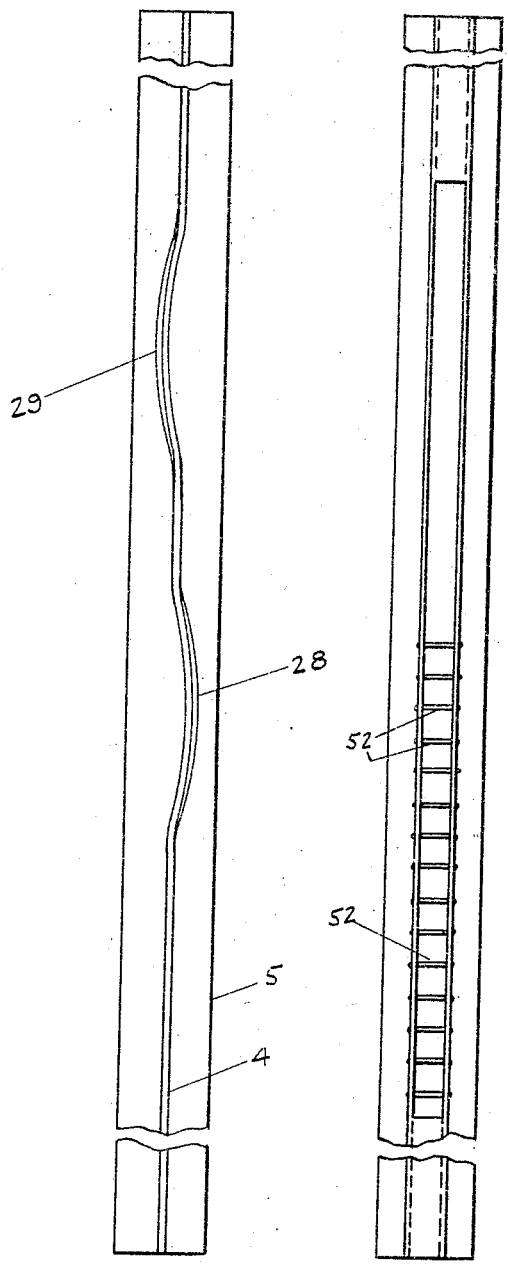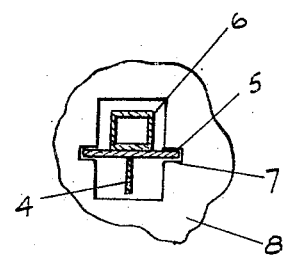

UNITED STATES PATENT OFFICE.

GEORGES A. DE GUIRE, OF MONTREAL, QUEBEC, CANADA.

ELECTROMECHANICAL MOTOR.

1,296,635.

Specification of Letters Patent. Patented Mar. 11, 1919.

Application filed April 30, 1917. Serial No. 165,458.

*To all whom it may concern:*

Be it known that I, GEORGES A. DE GUIRE, a subject of the King of Great Britain, residing at Montreal, in the Province of Quebec, Dominion of Canada, have invented new and useful Improvements in Electromechanical Motors, of which the following is a specification.

The invention to be hereinafter described relates to electromechanical motors.

In order to more clearly disclose the construction, operation, and use of the invention, reference should be had to the accompanying drawings forming part of this application. Throughout the several figures of the drawings, like reference characters designate the same parts.

In the drawings:—

Fig. 3 is an enlarged view of the upper half of Fig. 2;

Fig. 4 is a cross section on line 4—4 of Fig. 1, looking in the direction of the arrows;

Fig. 5 is a similar view on line 5—5;

Fig. 6 is a similar view on line 6—6;

Fig. 7 is a cross section on line 7—7 of Fig. 2, looking in the direction of the arrows;

Fig. 8 is a similar view on line 8—8;

Fig. 9 is a similar view on line 9—9;

Fig. 12 is an elevation of the cam bar;

Fig. 13 is an elevation of the pin tube; and,

Fig. 14 is a fragmentary detail of the guide for the bar and tube.

Figure 1:
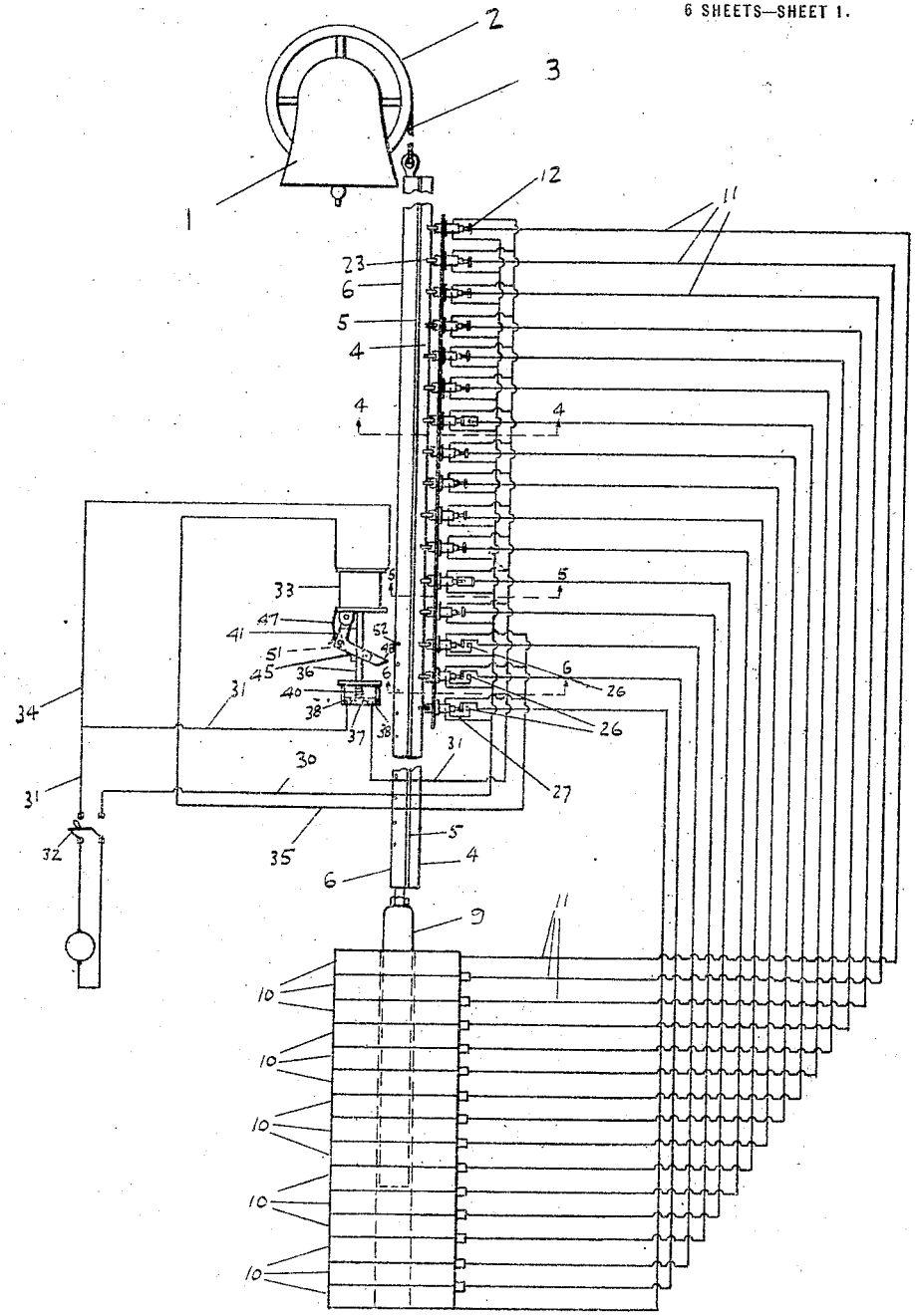
Figure 1 is a complete diagrammatic view of the invention as applied to ringing a bell, the parts being in normal position.
Figure 2:
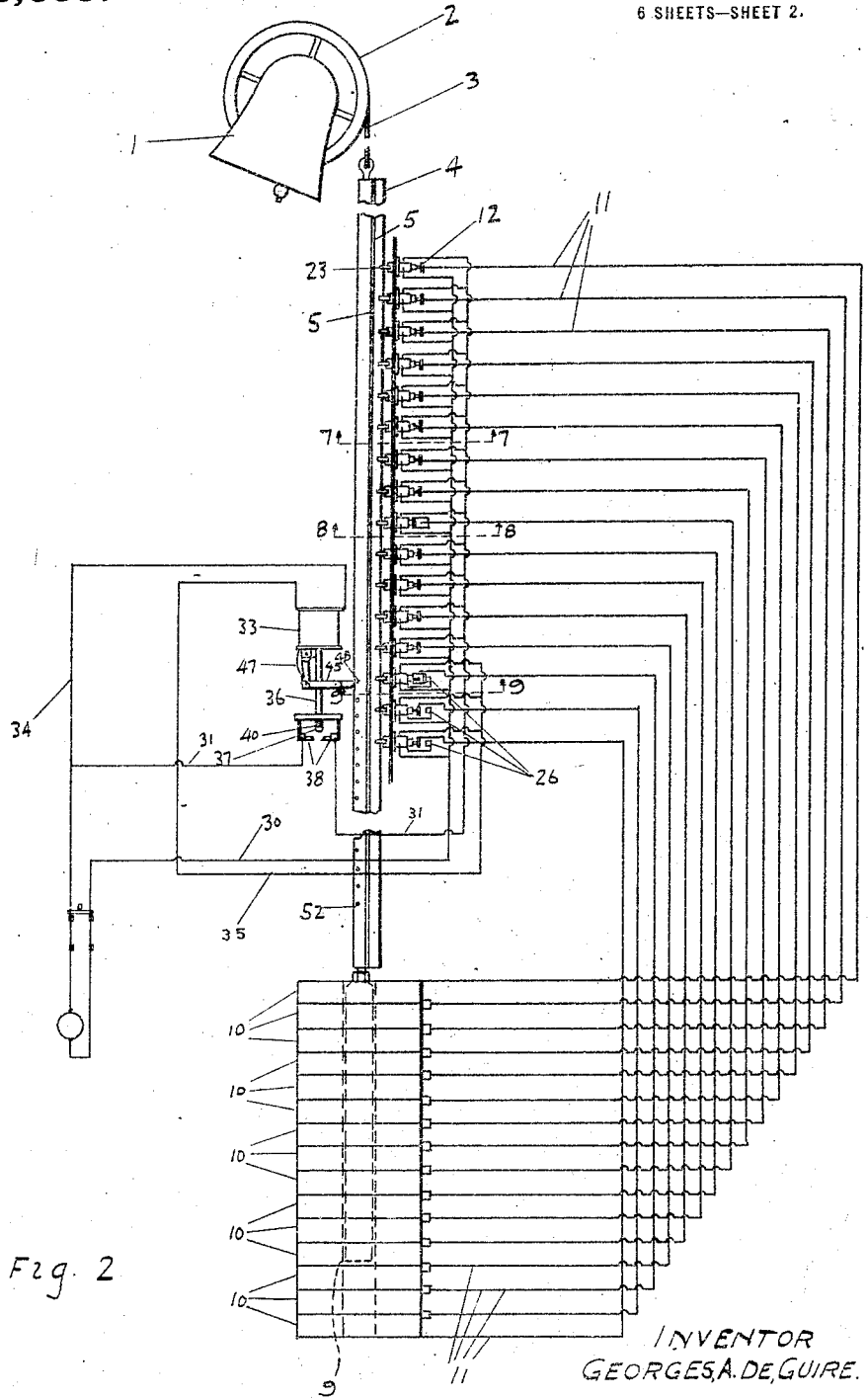
Fig. 2 is a similar view, showing the parts in their positions at the completion of the first movement of the bell.

The main objects of the invention are to provide a simple, efficient, compact, and economical electromechanical motor in which an electrically operated mechanical device automatically actuates a switch which controls the electric energy for operating the mechanical device. A further object is to provide automatically actuated mechanical means for breaking or cutting out, at a predetermined point, the circuit which operates the mechanical device. A further object of the invention is to provide means whereby the movement of a mechanical part may be progressively increased from a minimum to a maximum and thereafter continued at the maximum as long as desired. Other and further objects will appear from the following specification, and claims, and the drawings.

As shown in the drawings, the invention is used for ringing a bell. Such a use brings out, particularly, the progressive increase from the minimum to the maximum in the movement of the mechanical part, with continued maximum movement after the maximum point has been reached. In other words, the invention would operate a bell in just the same manner as it would be rung by hand, except that the operation would be much more uniform and accurate. In the hand operation there is, necessarily, a certain amount of guesswork and inaccuracy, as to the time of pulling down on the bell rope, after the bell has swung back from the previous pull. This is completely eliminated in the present invention, resulting in a perfectly smooth running, uniform and accurate operation, as will later appear.

Figure 11:
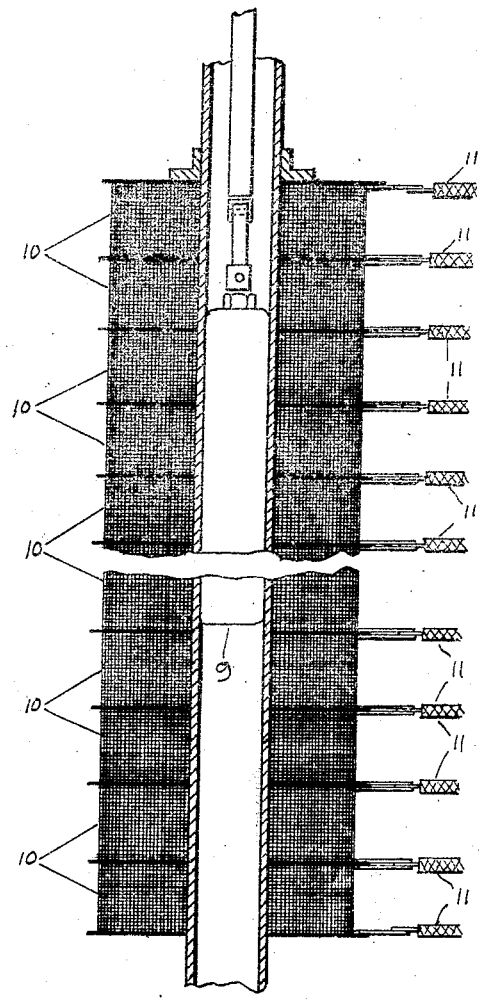
Fig. 11 is an enlarged central, vertical cross section of the sectional coil.

Referring to the drawings in detail, 1 indicates a bell mounted in the usual way and operated by the usual pulley 2 to which is secured the upper end of the usual bell rope 3. The lower end of this is connected to the sliding reciprocable mechanical member, comprising cam bar 4, guide plate 5, and pin tube 6, all connected together and traveling as one element. To insure a perfectly true, vertical sliding movement of this element, guide plates 8 are provided near the top and bottom of the uprights 19, having openings 7 which provide a sliding fit for the guide plate 5, as more clearly shown in Fig. 14. To the lower end of this member or element is connected a core 9 which is freely slidable in an opening through an electromagnet which is made up of a plurality of separate electrically insulated coils 10 which are connected in series, as more clearly shown in Fig. 11. The coil sections of this magnet are energized in a group, which is automatically, continually changed, as will later appear. From each coil section, a coil wire 11 leads off. For all coils, a series connection is used, so that each of these acts as a conductor for either of the two coils, as required, as will later appear. At the same time, the series connections permits the current to flow from coil to coil through the predetermined number of coils constituting the group which creates a magnetic field operating on the core 9. To complete the entire series, an additional coil wire leads off from the free end of the wire of the first and last coils, but, of course, is not connected to the next adjacent coil. Each coil wire except the lower three, is connected to a contactor plate 12 having slightly curved contact ends 13, adapted to alternately engage the carbon terminals 14, as will later appear. This alternate engagement is effected by the swinging of arm 15 on its pivot 16 in the ears 17 of a small slotted plate 18 which is secured, in any suitable manner, to angle iron uprights or frame members 19. Plates 18 also act as bases or supports for the posts 20 which carry the carbon terminals 14. From each terminal extends a small metal lead 21, connecting it with a branch wire 22. The opposite end of the swinging arm 15, extending through the slot in plate 18, is provided with a horse-shoe yoke 23, the entrance opening being just wide enough to slidably receive the cam bar 4. The contactors 24 for the three last coil wires are constructed differently than the other contactors. Instead of being simply straight plates with both ends curved, slightly, only one end is slightly curved, while the other end 25 is offset considerably below the first. The terminals 26 coöperating with these offset ends are inverted and carried by U shaped brackets 27 on posts 20. Thus, when these arms are rocked both ends of the contactors will engage terminals at the same time, so that a current may pass freely from one terminal through the contactor, and to the other terminal, whereas, with the other contactor, only one terminal at a time can be engaged by the contactor. This will be clear on reference to Figs. 4, 5, and 9.

Figure 10:
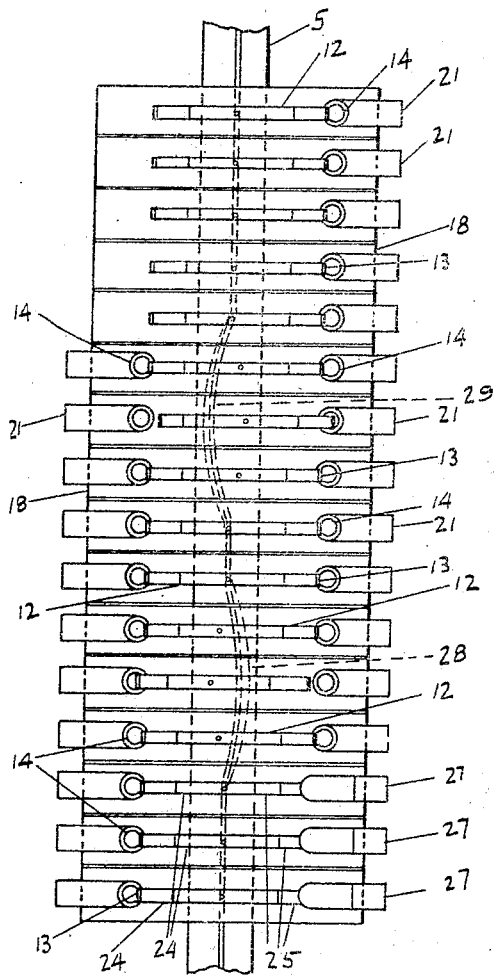
Fig. 10 is an enlarged rear elevation of the contactors, terminals, and cam bar.

Cam bar 4 has two portions of its length shaped into cam surfaces 28 and 29, these cam surfaces being directed oppositely to each other and connected by a straight section of the bar—see Figs. 10 and 12. Now, if bar 4 were a simple straight bar, it would slide freely through the yokes of all of the swinging arms 15 without operating any of them. But, being provided with the cam surfaces 28 and 29, it can not travel freely through the yokes. The cams engage the yokes and force the arms to swing. Only the cam portions will operate the arms, of course, the straight portions sliding freely and keeping the arms in normal or inoperative position. Cam 28 will cause the arms engaged by it to swing in one direction while the arms engaged by cam 29 will be simultaneously swung in the opposite direction. Both cams are of the same length, curvature, and pitch, but oppositely arranged. Consequently, each will cause the same amount of swing of arms 15. The extreme swing of each arm is designed to bring its contactor end 13 into momentary engagement with one of the terminals 14, except in the case of the last three contactors. With them, the extreme swing brings both ends simultaneously into momentary engagement or contact with the terminals 26 and 14, as clearly shown. Thus, when the parts are in normal position, before any operation has started, (Fig. 1) two of the contactors 12 will be in engagement with terminals 14, at opposite sides of the line of travel of the cam bar; one being operated by cam surface 28 and the other by the cam surface 29, see Figs. 1, 4, 5, and 10. But, none of the three lower contactors will be in operation —see Figs. 1, 6, and 10. To all branch wires 22, of one set, is connected a main circuit wire 30 which leads to one side of the source of electric supply. To all of the branch wires of the other set except the last three is connected another main circuit wire 31 which leads to the opposite side, a suitable switch 32 being provided for breaking or completing the circuit when desired.

An automatic switch, hereinafter described, is interposed in the main circuit wire 31. When closed, the current will flow through it. It is opened electrically, by a coil 33, from which a branch wire 34 connects with main wire 31 at a point between the two switches. The other end of the coil wire is connected to conductor 35 which is connected to the branch wires 22 of the terminals 26. Into the lower end of coil 33 extends the upper end of the reciprocable rod 36 on the lower end of which is carried the switch head 37 adapted to be seated on the terminals 38 of the wire 31, to close the circuit therethrough. These terminals are carried in the oil cup 39 through the cover of which rod 36 slides. A coil spring 40, is disposed about the rod and between the cover and switch head tends, normally, to force the switch down onto the terminals 38. To retain it in raised position, against the action of spring 40 a lock arm trip is provided. This is an L shaped arm 41, having the upper end of its short arm pivoted at 42 in an ear 43 extending downwardly from the lower face of the frame of the switch. This arm carries, near its angle, a pin 44 which engages a shoulder 45 on the lower end of a wedge plate 46 carried by rod 36. A leaf spring 47 acts to throw the arm into operative position the instant that rod 36 is raised to the position where pin 44 may engage shoulder 45. This, of course, locks the switch open after the momentary circuit of the coil 33 has been broken. The outer end of the long arm of the trip is bifurcated to receive the shank 47' of a tip 48 pivotally mounted therein by a pin 49 and held normally alined with the long arm of the trip by a leaf spring 50. This tip has a limited upward swinging movement about its pivot, counter to the action of spring 50, but is prevented from swinging downwardly below the arm, by shoulders which engage the ends of the arm near the pivot, as will be clear on reference to Fig. 3. This flexible construction of the tip permits the pins of tube 6 to pass freely upward, the tip simply swinging back for each pin and then snapping into place beneath it, as will be readily understood. But, as the pin tube travels in the opposite direction and one or another of its pins 52 engage the tip, the tip will be forced down and the pin 44 disengaged from shoulder 45, allowing spring 40 to close the switch, all as will later appear. To prevent injury to the tip, as the pins travel downwardly, it must be swung more completely back and out of the path of travel of the pins. For this purpose plate 46 is provided with an inclined or wedge face or wall 51, leading upwardly from shoulder 45. Consequently, as the tip is forced down by the first pin that engages it, the pin 44, passing from shoulder 45, will be engaged by the inclined wall 51 which, as rod 36 descends, will force the pin farther back, drawing the tip completely clear of the path of the pin, as more clearly shown in Fig. 1.

Now, assume that the invention is applied to the ringing of a bell: Normally, before any operation starts, the parts will be in the positions shown in Figs. 1, 4, 5, 6, and 10, with the automatic switch closed and the motor switch 32 open, the bell hanging vertically, of course. It should be noted that there is only one pin above the trip arm tip, and that the lower end of core 9 is at the bottom of the eleventh coil. At this stage, the cam surfaces of cam bar 4 are in the positions to operate the contactors in the order shown in Figs. 1, 4, 5, 6, and 10. Thus, the seventh contactor 12 is rocked by cam surface 29 so that one of its tips 13 is in engagement with the corresponding carbon terminal 14 electrically connected through a branch wire 22 with the main circuit wire 31; the twelfth contactor is rocked in the opposite direction by cam 28, engaging its coöperating terminal 14 from which branch wire 22 leads to the other main circuit wire 30; and all other contactors are either in normal positions or only slightly rocked,—not enough to engage any terminals. To start operation, switch 32 is closed. Current will then flow from the supply, through main circuit wire 30, through the twelfth terminal 14 and its contactor, into the coil wire 11 of that contactor, through it to coil 10, through coils 11, 10, 9, 8, and 7, and out along the coil wire leading from the seventh coil to the seventh contactor, through that contactor to its coöperating terminal 14, through the connections of that terminal to the other branch 31 of the main circuit, through terminals 38 and switch 37; and back to the supply, completing the circuit. This energizes the five coils, and exerts a downward pull on core 9. As core 9 moves down, cams 29 and 28 pass beyond the yokes of the swinging arms of the seventh and twelfth contactors and into the yokes of the swinging arms of the eighth and thirteenth contactors, simultaneously returning the seventh and twelfth to normal position and placing the eighth and thirteenth in circuit with the supply. Continued downward movement from this point, will carry the bell and all parts to the positions shown in Figs. 2, 7, 8, and 9. In this position, cam 29 has passed through the yoke of the swinging arm of the eighth contactor and into the yoke of the ninth, rocking it to operative position, and cam 28 has passed through the yoke of the swinging arm of the thirteenth contactor and into the yoke of the swinging arm of the fourteenth contactor, which is the first of the three lower contactors. Now, if this fourteenth contactor and its connections were the same as the first thirteen, the same operation would be repeated, simply pulling the core 9 farther down. But, instead, the fourteenth contactor (as also the fifteenth and sixteenth) when rocked by cam 28, engage opposite terminals 14 and 26 at the same time. Current now flows through main circuit wire 30, branch wire 22 to terminal 26, through contactor fourteenth 25—24, through terminal 14 coöperating therewith, through branch wire 22, through magnet wire 35 to the magnet coil 33, from the coil 33 through wire 34 to the supply. This energizes the coil 33, which immediately attracts and lifts rod 36, opening the switch 37 and preventing any current from passing through the coils 10. This, of course, cuts off the pull on core 9. As the rod 36 rises, spring 47 snaps the arm 41 in position, pin 44 dropping in below the shoulder 45 and holding the switch open. It will be noticed that the top pin has passed below the position which the tip of the arm has just assumed, allowing room for the tip to swing freely up without danger of striking any pins. Now, as the pull is cut off, the bell gravitates toward its normal or vertical position. In doing so, it will draw the core and the mechanical element up with it, the flexible tip of the arm 41 snapping back beneath each pin as the pin passes upward beyond it. But, the momentum of the bell will carry it almost as far beyond the vertical in the opposite direction as it was when the pull ceased. Consequently, several pins will have passed above the tip of the trip arm by the time that the bell again starts to swing back toward vertical. And, of course, there will be more pins above the tip, and the cam bar will be higher and in a position to actuate more contactors, at this stage, than at the very first start, described in relation to Fig. 1. As it starts this second swing toward the vertical, it will, of course, pay out the bell rope and allow the core and attached mechanical element to move down, as when the current was first thrown on by switch 32. As this downward movement starts, the first pin 52 above the tip of the trip arm will engage it, force it down, and free rod 36 to the action of spring 40, which instantly closes the switch 37, which immediately sends the current through the coil sections, as the respective contactors are rocked by cams 28 and 29. Consequently, the pull is exerted through a longer period of time than in the first pull, the bell will be swung farther toward the horizontal or maximum, and its momentum on the return will carry it a proportionately greater distance in the opposite direction, with the result that the next pull will be proportionately increased. This continues until the maximum has been reached. The maximum is limited only by the number of coils. Each coil effects a certain amount of pull, of course. So, it is only necessary to determine the length of pull on the bell rope necessary to carry the bell from a vertical to a substantially horizontal position, in order to determine how many coil sections are required for operating the core. The switch operating coils are put below these, of course, as they are always the last to be brought into operation. Only one of these is really necessary, of course, but, for safety, several are provided, in case the first one should fail to work. The number of pins 52 corresponds to the number of coils and the contactors for pulling the core. After the bell has reached its maximum swing, on every alternate swing, the pin tube will travel downwardly just twice the distance of the maximum pull. Consequently, the pin side of the tube must be slotted or left open for slightly more than that distance above the topmost pin, as in Fig. 3, so that there can be no possible interference with the tip of the trip arm as it swings into operative position. It will be remembered that the trip arm is raised to horizontal position or operative position immediately after the topmost pin passes below it. Consequently, since on every alternate swing, the tube continues downwardly from this point for one half the length of its maximum down travel, the tube above the topmost pin must be slotted a corresponding distance so that its edge will not engage and trip the arm prematurely.

It will be clearly understood that the magnetic field acting upon the core travels, automatically, with the core from start to finish of the movement of the core in one direction, but on completion of that movement is instantly automatically cut out, being instantly and automatically cut in again at the beginning of the next movement in the same direction.

It will be clear, of course, that bell ringing is only one of many uses to which the invention may be applied. Especially may it be applied to any apparatus or device in which there is either a single element which has a reciprocating or equivalent movement, or several elements the movements of which may be combined to produce reciprocating or equivalent movement.

It is thought that the construction, operation, and use of the invention will be clear from the preceding detailed description. Changes may be made in the construction, arrangement and disposition of the several parts of the invention, without in any way departing from the field and scope of the invention and it is meant to include all such within this application, wherein only one form has been shown by way of illustration.

Having thus described my invention, what I claim and desire to protect by Letters Patent is:—

1. An electromechanical motor, comprising a main circuit, an endwise movable magnetizable core, magnet coils surrounding said core and connected in series, terminals connected to said main circuit, movable contactors connected to said coils respectively and coöperating with said terminals, and a longitudinally reciprocating bar carrying means for mechanically actuating said contactors successively to make a circuit through some of said coils.

2. An electromechanical motor, comprising a main circuit, an endwise movable magnetizable core, magnet coils surrounding said core and connected in series, terminals connected to said main circuit, movable contactors connected to said coils respectively and coöperating with said terminals, and a longitudinally reciprocating bar carrying means for mechanically actuating said contactors successively to make and break a circuit through some of said coils in such order that the magnetic field of the coils will travel with the aforesaid core.

3. An electromechanical motor comprising, a main circuit, a plurality of magnet coils connected in series, a plurality of terminals connected to the aforesaid main circuit, a plurality of movable contactors coöperating with said terminals, a coil wire leading from each coil to a corresponding contactor, means for automatically actuating said contacts successively to complete a circircuit through some of said coils, and means for automatically breaking the circuit thus completed.

4. An electromechanical motor comprising, a plurality of magnet coils connected in series, a main circuit, a set of terminals connected to one branch of said main circuit, a second set of terminals connected to another branch of said main circuit, a third set of terminals, a switch in one branch of said main circuit, a coil for operating the same, connections between said coil and said third set of terminals, connections between said coil and one branch of said main circuit, means for connecting said third set of terminals with the other branch of said main circuit, a plurality of movable contactors coöperating with said first and said second sets of terminals, and means for actuating said contactors to complete a circuit through said main circuit and some of said coils.

5. An electromechanical motor comprising a plurality of magnet coils connected in series, a main circuit, a set of terminals connected to one branch of said main circuit, a second set of terminals connected to another branch, an automatic switch in one branch of said main circuit, a coil for operating said switch, connections between said coil and one branch of said main circuit, a third set of terminals, connections between said third set of terminals and said coil, a set of movable contactors coöperating with corresponding terminals of the first and second sets, a second set of movable contactors coöperating with corresponding terminals of the second and third sets, and means for actuating the contactors in such order that contactors of the first set will first complete a circuit through some of the coils and the main circuit wires, and then the contactors of the second set will complete a circuit through the coil of the automatic switch to open it and break the circuit made by the contactors of the first set.

6. An electromechanical motor comprising, a plurality of magnet coils connected in series, a main circuit, a set of terminals connected to one branch of said main circuit, a second set of terminals connected to another branch, an automatic switch in one branch of said main circuit, a coil for operating said switch, connections between said coil and one branch of said main circuit, a third set of terminals, connections between said third set of terminals and said coil, a set of movable contactors coöperating with corresponding terminals of the first and second sets, a second set of movable contactors coöperating with corresponding terminals of the second and third sets, means for actuating the contactors in such order that contactors of the first set will first complete a circuit through some of the coils and the main circuit wires, and then contactors of the second set will complete a circuit through the coil of the automatic switch to open it and break the circuit made by the contactors of the first set, and means for closing said switch.

7. An electromechanical motor comprising, a plurality of magnet coils connected in series, a main circuit, a set of terminals connected to one branch of said main circuit, a second set of terminals connected to another branch, an automatic switch in one branch of said main circuit, a coil for operating said switch, connections between said coil and one branch of said main circuit, a third set of terminals, connections between said third set of terminals and said coil, a set of movable contactors coöperating with corresponding terminals of the first and second sets, a second set of movable contactors coöperating with the corresponding terminals of the second and third sets, means for actuating the contactors in such order that the contactors of the first set will first complete a circuit through some of the coils and the main circuit wires, and then the contactors of the second set will complete a circuit through the coil of the automatic switch to open it and break the circuit made by the contactors of the first set, and means for breaking the circuit of the automatic switch.

8. An electromechanical motor comprising, a plurality of magnet coils connected in series, a main circuit, a set of terminals connected to one branch of said main circuit, a second set of terminals connected to another branch, an automatic switch in one branch of said main circuit, a coil for operating said switch, connections between said coil and one branch of said main circuit, a third set of terminals, connections between said third set of terminals and said coil, a set of movable contactors coöperating with corresponding terminals of the first and second sets, a second set of movable contactors coöperating with corresponding terminals of the second and third sets, means for actuating the contactors in such order that contactors of the first set will complete a circuit through some of the coils and the main circuit wires, and then contactors of the second set will complete a circuit through the coil of the automatic switch to open it and break the circuit made by the contactors of the first set, means for closing said switch, and means for retaining said switch in open position.

9. An electromechanical motor comprising, a plurality of magnet coils connected in series, a main circuit, a set of terminals connected to one branch of said main circuit, a second set of terminals connected to another branch, an automatic switch in one branch of said main circuit, a coil for operating said switch, connections between said coil and one branch of said main circuit, a third set of terminals, connections between said third set and said coil, a set of movable contactors coöperating with corresponding terminals of the first and second sets, a second set of movable contactors coöperating with corresponding terminals of the second and third sets, means for actuating the contactors in such order that contactors of the first set will complete a circuit through some of the coils and the main circuit wires, and then contactors of the second set will complete a circuit through the coil of the automatic switch to open it and break the circuit made by the contactors of the first set, means for closing said switch, means for retaining said switch in open position, and means for moving said retaining means to releasing position.

10. An electromechanical motor comprising a main circuit, an endwise movable magnetizable core, magnet coils surrounding said core and connected in series, terminals connected to said main circuit, movable contactors connected to said coils respectively and coöperating with said terminals and a device carried by said core and provided with means for mechanically actuating said contacts successively to make a circuit through some of said coils.

11. An electro-mechanical motor comprising a main circuit, an endwise movable magnetizable core, magnet coils surrounding said core and connected in series, terminals connected to said main circuit, movable contactors connected to said coils respectively and coöperating with said terminals, a device carried by said core and provided with means for mechanically actuating said contactors successively to make and break a circuit through some of said coils in such order that the magnetic field of the coils will travel with the aforesaid core, and means for automatically breaking the main circuit as the core reaches the end of its travel in one direction.

12. An electromechanical motor comprising, a main circuit, a plurality of magnet coils connected in series, a set of terminals connected to one branch of said circuit, a second set of terminals connected to the other branch of said main circuit, contactors coöperating with said terminals, and a slidably mounted longitudinally reciprocating cam bar adapted to actuate said contactors in such manner as to make and break circuits through the aforesaid coils.

13. An electromechanical motor comprising, a main circuit, a plurality of magnet coils connected in series, a set of terminals connected to one branch of said main circuit, a second set of terminals connected to the other branch thereof, a plurality of movable contactors coöperating with said terminals, and a reciprocable bar provided with oppositely directed cam surfaces at different points in its length adapted to actuate said contactors, to complete circuits through said coils.

14. An electromechanical motor comprising, a main circuit, a plurality of magnet coils connected in series, a set of terminals connected to one branch of said main circuit, a second set of terminals connected to the other branch thereof, a plurality of movable contactors coöperating with said terminals, a reciprocable bar provided with oppositely directed cam surfaces at different points in its length adapted to actuate said contactors, to complete circuits through said coils, and a core carried by said bar and traveling in the aforesaid coils.

15. An electromechanical motor comprising, a main circuit, a plurality of magnet coils connected in series, a set of terminals connected to one branch of the main circuit, a second set of terminals connected to another branch of the main circuit, a set of movable contactors coöperating with the first and second sets of terminals, an automatic switch in one branch of the main circuit, a coil for opening the same, connections between the coil and one branch of said main circuit, a third set of terminals, connections between said third set of terminals and said switch coil, a second set of movable contactors coöperating with said second and third sets of terminals, a movable cam bar provided with oppositely directed cam surfaces adapted to successively actuate contactors of both sets in such order as to first complete successive circuits through a progressively changing group of the coils aforementioned, and then break the last of said circuits by completing a circuit through one of the contactors of the third set and the switch coil, and a core carried by said bar and traveling in said coils.

16. An electromechanical motor comprising, a main circuit, a plurality of magnet coils connected in series, a set of terminals connected to one branch of the main circuit, a second set of terminals connected to another branch of the main circuit, a set of movable contactors coöperating with the first and second sets of terminals, an automatic switch in one branch of the main circuit, a coil for opening the same, connections between the coil and one branch of said main circuit, a third set of terminals, connections between said third set of terminals and said switch coil, a second set of movable contactors coöperating with said second and third sets of terminals, a movable cam bar provided with oppositely directed cam surfaces adapted to successively actuate contactors of both sets in such order as to first complete successive circuits through a progressively changing group of the coils aforementioned, means for returning the aforesaid automatic switch to closed position, and means for breaking the last of the aforementioned circuits by completing a circuit through one of the contactors of the third set and the switch coil, and a core carried by said bar and traveling in said coils.

17. An electromechanical motor comprising, a main circuit, a plurality of magnet coils connected in series, a set of terminals connected to one branch of the main circuit, a set of terminals connected to another branch of the main circuit, a set of movable contactors coöperating with the first and second sets of terminals, an automatic switch in one branch of the main circuit, a coil for opening the same, connections between the coil and one branch of said main circuit, a third set of terminals, connections between said third set of terminals and said switch coil, a second set of movable contactors coöperating with said second and third sets of terminals, a movable cam bar provided with oppositely directed cam surfaces adapted to successively actuate contactors of both sets in such order as to first complete successive circuits through a progressively changing group of the coils aforementioned, and then break the last of said circuits by completing a circuit through one of the contactors of the third set and switch coil, a movably mounted trip arm, means carried thereby and adapted to retain said switch in open position, a tube carried by the aforesaid cam bar, pins mounted in said tube and adapted to engage and trip said arm, and a core carried by said bar and traveling in said coils.

18. An electromechanical motor comprising, a main circuit, a plurality of magnet coils connected in series, a set of terminals connected to one branch of the main circuit, a second set of terminals connected to another branch of the main circuit, a set of movable contactors coöperating with the first and second sets of terminals, an automatic switch in one branch of the main circuit, a coil for opening the same, connections between the coil and one branch of said main circuit, a third set of terminals, connections between said third set of terminals and said switch coil, a second set of movable contactors coöperating with said second and third sets of terminals, a movable cam bar provided with oppositely directed cam surfaces adapted to successively actuate contactors of both sets in such order as to first complete successive circuits through a progressively changing group of the coils aforementioned, and then break the last of said circuits by completing a circuit through one of the contactors of the third set and the switch coil, a movably mounted trip arm, means carried thereby and adapted to retain said switch in open position, means for swinging said arm to operative position, a tube carried by the aforesaid cam bar, pins mounted in said tube and adapted to engage and trip said arm, means for swinging said arm to a safety position beyond the path of travel of the pins, and a core carried by said bar and traveling in said coils.

Signed at Montreal this 24th day of April, 1917.

GEORGES A. DE GUIRE.

Copies of this patent may be obtained for five cents each, by addressing the "Commissioner of Patents, Washington, D. C."